(12) United States Patent
Hortala et al.

(10) Patent No.: US 10,664,379 B2
(45) Date of Patent: May 26, 2020

(54) AUTOMATED SOFTWARE VERIFICATION SERVICE

(71) Applicant: Amazon Technologies, Inc., Seattle, WA (US)

(72) Inventors: Juan Rodriguez Hortala, Seattle, WA (US); Neha Rungta, San Jose, CA (US); Mark R. Tuttle, Arlington, MA (US); Serdar Tasiran, New York, NY (US); Michael Tautschnig, London (GB); Andrea Nedic, New York, NY (US); Carsten Varming, Brooklyn, NY (US); John Byron Cook, Brooklyn, NY (US); Sean McLaughlin, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/122,676

(22) Filed: Sep. 5, 2018

(65) Prior Publication Data
US 2020/0073783 A1 Mar. 5, 2020

(51) Int. Cl.
G06F 9/44 (2018.01)
G06F 11/36 (2006.01)
G06F 9/54 (2006.01)
G06F 8/65 (2018.01)
G06F 9/50 (2006.01)

(52) U.S. Cl.
CPC .......... *G06F 11/3608* (2013.01); *G06F 8/65* (2013.01); *G06F 9/5077* (2013.01); *G06F 9/54* (2013.01)

(58) Field of Classification Search
CPC .................................................. G06F 11/3608
USPC ............................................................ 717/126
See application file for complete search history.

(56) References Cited

U.S. PATENT DOCUMENTS 5,651,111 A * 7/1997 McKeeman ........ G06F 11/3688
714/38.1
8,261,126 B2 * 9/2012 Sosnosky ............ H04L 67/1095
714/13

(Continued)

OTHER PUBLICATIONS

David Wells, "Five Key Benefits of "Going Serverless"", Aug. 2018, https://www.netlify.com/blog/2018/08/06/five-key-benefits-of-going-serverless/ (Year: 2018).*

(Continued)

*Primary Examiner* — Wei Y Zhen
*Assistant Examiner* — Lanny N Ung
(74) *Attorney, Agent, or Firm* — Quarles & Brady LLP

(57) ABSTRACT

A method for verifying source code for a program includes determining that a new version of the source code is available. One or more verification tools are determined to use for verification of the new version of the source code from a verification specification associated with the source code. A plurality of verification tasks to perform for the verification of the new version of the source code are automatically determined from the verification specification associated with the source code. The plurality of verification tasks for the new version of the source code are automatically performed using the one or more verification tools. A determination is then made as to whether the new version of the source code is verified.

10 Claims, 9 Drawing Sheets

(56) References Cited

U.S. PATENT DOCUMENTS

| | | | | |
|---|---|---|---|---|
| 8,914,679 B2* | 12/2014 | Apostoloiu | ......... | G06F 11/3684 |
| | | | | 714/38.1 |
| 9,032,373 B1* | 5/2015 | Gupta | ................ | G06F 11/3688 |
| | | | | 717/127 |
| 2005/0283761 A1* | 12/2005 | Haas | .................. | G06F 11/3688 |
| | | | | 717/124 |
| 2007/0061782 A1* | 3/2007 | Schreiner | ................. | G06F 8/71 |
| | | | | 717/124 |
| 2007/0174741 A1* | 7/2007 | Vasudevan | .......... | G06F 11/0787 |
| | | | | 714/57 |
| 2014/0282421 A1* | 9/2014 | Jubran | ............... | G06F 11/3664 |
| | | | | 717/126 |
| 2017/0364432 A1 | 12/2017 | Nishi | | |
| 2018/0075647 A1 | 3/2018 | Kim et al. | | |
| 2018/0088993 A1 | 3/2018 | Gerdesmeier et al. | | |

OTHER PUBLICATIONS

Boerman Jan et al, Reasoning About JML: Differences Between KeY and OpenJML, IFM 2018, LNCS 11023, pp. 30-46, Springer, Berlin.

* cited by examiner

```
Version: '0.1'

Defaults:
  image: ubuntu:latest

Env:
  - OpenJML_opts: '-progress -timeout=600 -classpath . -esc -spec-math=bigint -code-math=safe -minQuant -no-staticInitWarning'

Stages:
  - name: patch tasks:
      commands:
        - mkdir patched

- input/stage/${AWS_PROVER_FETCH_SRC_STAGE}/task/0/source/scripts/apply_patches.sh -o patched artifacts:
        - patched

- name: verify dependsOn:
      - patch image: aws-prover/openjml-z3:latest
    partitions: 40 tasks:
      groupingCommands:
        - mkdir verify
        # take all files in the "patched" artifact of the patch stage for all its single task

- cp -r stage/patch/task/0/patched/* verify
        # send each patched file to (potentially) a different task
        - find verify -type f
      commands:
        - openjml ${OPENJML_OPTS} -dir input/verify
```

AUTOMATED SOFTWARE VERIFICATION SERVICE

BACKGROUND

Often it is difficult to verify whether software will perform the tasks that it was designed to perform. Accordingly, proofs are commonly written that specify what a piece of software is supposed to do and how to test that the software does what it is supposed to do.

Programs are constantly evolving. Even if verification is performed on one version of a program, that verification does not apply for any future versions of the program. Verification of programs should be performed each time a new version of code for the program is generated to ensure that the same safety guarantees for all subsequent releases of the program are maintained. For example, any formal proof about a program should be checked again with each new update to ensure that all safety properties certified by the proof are still guaranteed. However, verifying a particular version of a program (e.g., checking a proof) is a computationally expensive process and can take many hours to complete (e.g., up to 10 hours or longer). Moreover, verifying a version of a program by checking a proof for that program generally requires setting up a software stack that includes specialized verification tools (also referred to as proving technologies).

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

FIG. 3 illustrates an example verification specification, in accordance with one embodiment of the present disclosure.

DETAILED DESCRIPTION

Figure 1:
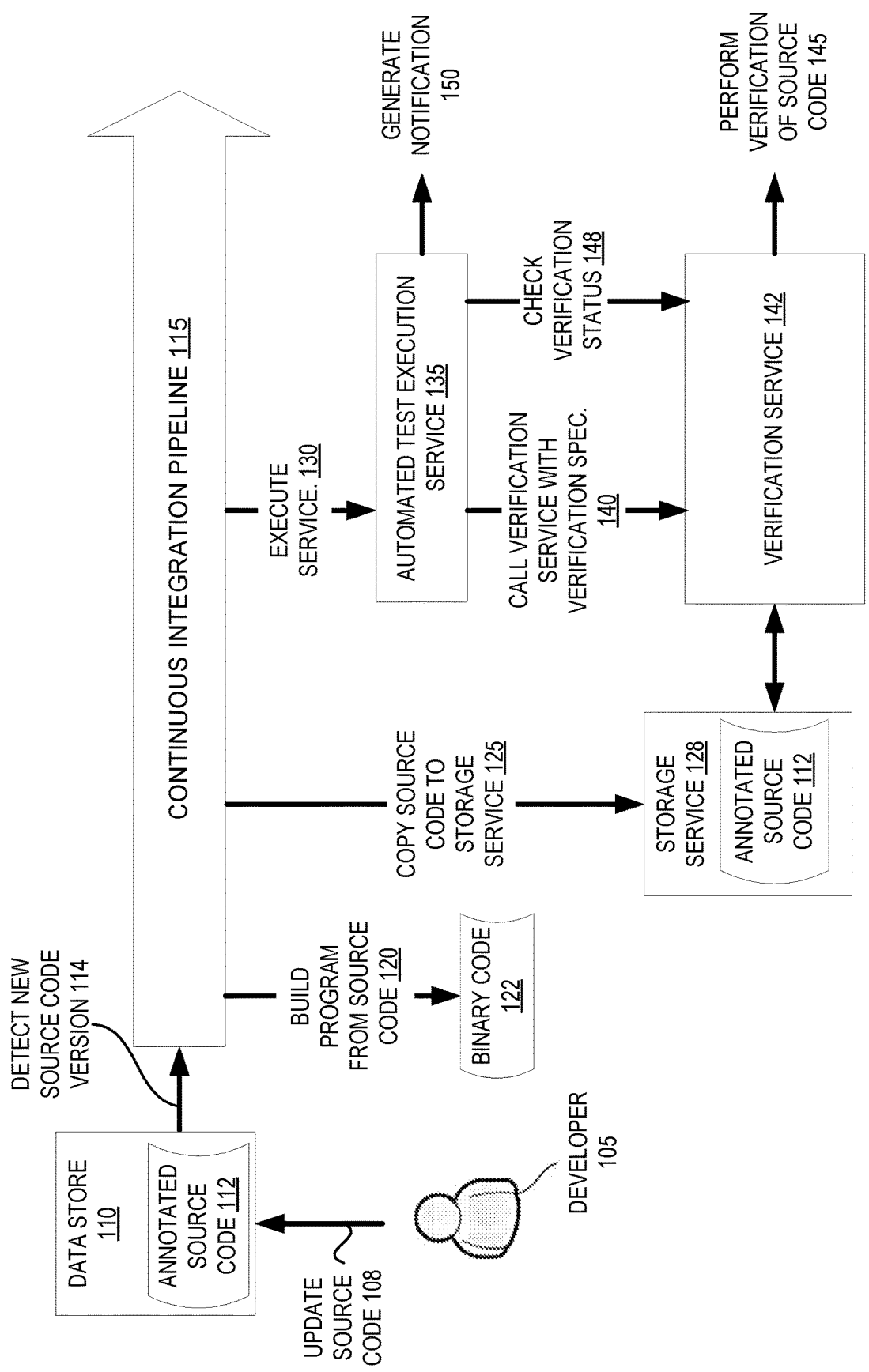
FIG. 1 illustrates an example continuous integration pipeline that includes an automated software verification service, according to embodiments of the present disclosure.

Embodiments of the present disclosure relate to a distributed computing system that harnesses the power of cloud computing to perform formal verification as well as other types of verification of software designs (e.g., programs). Embodiments of the present disclosure further relate to a generic service for performing verification of software designs, where the generic service resides behind a generic application programming interface (API) that can be used to invoke an entire constellation of formal verification technologies. Embodiments of the present disclosure further relate to a continuous integration (CI) pipeline that includes a software verification service that automatically verifies software as updates are made to that software. Thus, the verification service described in embodiments may be linked to an ongoing development and verification environment. Such automatic verification of a program as the program evolves reduces a lag between when software updates are complete and when such software updates are verified. Additionally, by performing software verification in a cloud computing environment, verification tasks can be split up and divided among many instances of virtual resources (e.g., virtual machines and/or virtual operating systems such as Docker containers), which may all perform separate verification tasks in parallel, vastly reducing the amount of time that it takes to complete formal verification of the software. Embodiments make it trivial to completely rerun a proof or verification and determine whether source code is still correct after every minor or major update.

In embodiments, a verification service takes as an input a project (e.g., source code for a project) with a verification specification or proof associated with the project. The verification specification may include dependencies between verification tasks (e.g., which verification tasks depend on the results of other verification tasks). The verification specification may also be parameterizable, and may specify particular verification tools (e.g., DV tools) to use to perform verification and/or specific patches or versions of particular verification tools. Verification tools (also referred to as proving technologies) include any type of software that performs some automated analysis of a given source code, to conclude whether or not the code fulfills some expected property. The verification tools may include formal verification tools and/or other types of verification tools.

In the context of hardware and software systems, formal verification is the act of proving or disproving the correctness of intended algorithms underlying a system with respect to a certain formal specification or property, using formal methods of mathematics. The verification of these systems is done by providing a formal proof on an abstract mathematical model of the system, the correspondence between the mathematical model and the nature of the system being otherwise known by construction. Examples of mathematical objects often used to model systems are: finite state machines, labelled transition systems, Petri nets, vector addition systems, timed automata, hybrid automata, process algebra, formal semantics of programming languages such as operational semantics, denotational semantics, axiomatic semantics and Hoare logic.

Some examples of verification tools and/or combinations of verification tools that may be specified include specific satisfiability modulo theories (SMT) solvers (e.g., such as Z3 and CVC4), specific modeling languages or verification environments (e.g., such as Java Modeling Language (JML), C Bounded Model Checker (CBMC), VCC, Dafny, etc.), specific interactive theorem provers (e.g., such as Higher Order Logic (HOL), ACL2, Isabelle, Coq or, or PVS), specific datalog implementations, and so on. Examples of types of verification tools other than formal verification tools include the Infer static analyzer, Klocwork, Oraclize, Fortify static code analysis tool, fuzzing tools (e.g., such as the Synopsys Fuzz Testing tool or American Fuzzy Lop tool), and so on. The verification specification may additionally identify specific commands to run for one or more verification tasks. The verification specification may further include an upper bound on a quantity of resources that will be used to perform a proof attempt for verification of a program. The verification service outputs a result of verification (e.g., a result of a proof attempt) on completion of a verification attempt.

The verification service may perform deductive verification to verify source code for a program in some embodiments. Additionally, the verification service may perform other types of verification (formal or otherwise). Deductive verification is performed by generating from a program's source code and its associated specification text a collection of mathematical proof obligations (or other verification conditions). The specification text may be included in comments of the source code and/or may be included in a separate specification file. If the proof obligations (or other verification conditions) are resolved to be true, this implies that the program source code conforms to the specification text, and a proof is verified. This results in successful verification of the program source code. The obligations may be verified using one or more verification tools, such as specification languages, interactive theorem provers, automatic theorem provers, and/or or satisfiability modulo theories (SMT) solvers. A DV tool may generate the mathematical proof obligations and convey this information to an SMT solver, either in the form of a sequence of theorems (e.g., mathematical proof obligations) to be proved or in the form of specifications of system components (e.g. functions or procedures) and perhaps subcomponents (such as loops or data structures), which may then determine whether the mathematical proof obligations hold true.

Computer-aided verification of computer programs often uses SMT solvers. A common technique is to translate pre-conditions, post-conditions, loop conditions, and assertions into SMT formulas in order to determine if all properties can hold. The goal for such verification is to ultimately mathematically prove properties about a given program (e.g., that its behavior matches that of its specification or proof).

In an example, JML and OpenJML may be used to express specifications and perform verification of programs. OpenJML translates Java code and formal requirements written in JML into a logical form and then mechanically checks that the implementation conforms to the specification. The checking of the verification conditions may be performed by a backend SMT solver, such as Z3. In other examples, other specification languages (also referred to as modeling languages) and/or other verification tools may also be used. The techniques set forth herein may be used to extend any such specification languages and/or other verification tools to enable those specification languages and/or other verification tools to also work in an automated fashion and/or by a single generic verification service.

In one embodiment, processing logic receives a request to verify source code for a program. The processing logic determines, using a first serverless function, one or more verification tools to use for verification of the source code. The processing logic further determines, using the first serverless function, a plurality of verification tasks to perform for the verification of the source code. Processing logic generates a queue comprising the plurality of verification tasks. Processing logic instantiates a plurality of virtual resources comprising the one or more verification tools. Some or all of the virtual resources then perform verification tasks. Performing a verification task includes selecting a verification task for a feature of the program from the queue, performing the verification task selected from the queue using the one or more verification tools, and outputting a result of the verification task. Processing logic then updates a progress indication associated with the verification of the source code using a second serverless function based on results output by the one or more virtual resources.

In one embodiment, a generic API associated with a verification service may be used to perform verification of software using a generic or arbitrary set of verification tools. The same generic API may be used for any combination of verification tools, including verification tools for different computer programming languages, different modeling languages, different SMT solvers, and so on. The same generic API may also be used for different patches or versions of verification tools.

In one embodiment, processing logic receives at an API a first request to verify a first source code for a first program. Processing logic determines a first set of verification tools to use for verification of the first source code. Processing logic determines a first plurality of verification tasks to perform for the verification of the first source code. Processing logic performs verification of the first source code using the first set of verification tools. Processing logic additionally receives at the API a second request to verify a second source code for a second program. Processing logic determines a second set of verification tools to use for verification of the second source code. Processing logic determines a second plurality of verification tasks to perform for the verification of the second source code. Processing logic performs verification of the second source code using the second set of verification tools. The software verification service may be a multitenant service, and/or may perform the verification of the first source code and the verification of the second source code in parallel.

In one embodiment, the software verification service is part of a CI pipeline, and may be invoked automatically to perform verification of new versions of source code. In one embodiment, processing logic determines that a new version of source code for a program is available. Processing logic then automatically determines one or more verification tools to use for verification of the new version of the source code from a verification specification associated with the source code. Processing logic additionally automatically determines a plurality of verification tasks to perform for the verification of the new version of the source code from the verification specification associated with the source code. Processing logic automatically performs the plurality of verification tasks for the new version of the source code using the one or more verification tools. Processing logic may then determine whether the new version of the source code is verified based on the performance of the verification tasks.

Turning now to the figures, FIG. 1 illustrates an example CI pipeline 115 that includes an automated software verification service 142, according to embodiments of the present disclosure. CI is a development practice in which software developers 105 integrate source code 112 with a shared repository (e.g., data store 110) on a regular and/or periodic basis (e.g., several times a day). The data store 110 may be, for example, a Git repository. A CI pipeline is a path or sequence of systems, functions and/or operations associated with CI that are triggered in sequence. Developers check in their source code 112 into the data store 110, which is then detected 114 by the CI pipeline 115. Detection of the new source code version 114 by the CI pipeline 115 triggers one or more processes to be performed on that code by the CI pipeline 115. Processes may be triggered in series, so that a next process in the CI pipeline 115 is triggered after a previous process has been successfully completed.

The CI pipeline 115 may be a continuous integration and delivery pipeline. Continuous delivery (CD) is an extension of CI that ensures that every change to the source code is releasable. CD enables new versions of software (e.g., software updates) to be released frequently and easily (e.g., with the push of a button).

In one embodiment, responsive to detecting a new version of source code 112, the CI pipeline 115 executes a build process that then performs a build operation on the source code 120 to generate binary code 122. The build process is a process that converts source code into a stand-alone form that can be run on a computing device. The build process may include compiling the source code (converting source code to executable or binary code), linking packages, libraries and/or features in the executable code, packaging the binary code, and/or running one or more automated tests on the binary code.

In one embodiment, if the build process for the source code 112 is successful, the CI pipeline 115 copies the source code to a storage service 128 (or second data store). For example, the CI pipeline 115 may copy the source code 112 into a cloud-based storage service such as Amazon Simple Storage Service (S3), Amazon Elastic File System (EFS) or Amazon Elastic Block Store (EBS).

Source code 112 may be an annotated source code. The annotated source code may include the actual source code as well as a proof associated with the source code. The proof may be a formal proof in a format expected by a verification tool in embodiments. The proof may also include any other script, patch and/or configuration file to be used for preprocessing the source code before beginning verification of the source code (before starting a proof attempt). The proof may be partially or completely embedded in the source code in the form of annotations in some embodiments. Alternatively, the proof may be a separate file.

A formal proof or derivation is a finite sequence of sentences (called well-formed formulas in the case of a formal language), each of which is an axiom, an assumption, or follows from the preceding sentences in the sequence by a rule of inference. If the set of assumptions is empty, then the last sentence in a formal proof is called a theorem of the formal system. The theorem is a syntactic consequence of all the well-formed formulas preceding it in the proof. For a well-formed formula to qualify as part of a proof, it should be the result of applying a rule of the deductive apparatus of some formal system to the previous well-formed formulae in the proof sequence.

Once the source code 112 is copied into the storage service 128 (or second data store), the CI pipeline 115 may execute 130 a worker for an automated test execution service (e.g., a test-on-demand (ToD) service) 135 to oversee the verification of the source code 112. The worker for the automated test execution service 135 may determine a version of the source code 112, and may make a call 140 to a verification service 142 to begin verification on the source code 140. The call 140 may specify the version of the source code 112 and/or an account identifier (ID) associated with the source code 112 and/or developer 105. The call 140 to the verification service 142 may additionally or alternatively include a verification specification. The verification specification may be a component of a verification project, or may constitute a verification project.

The verification service 142 may retrieve the annotated source code 112 from the storage service 128 (or second data store) and perform 145 one or more operations to verify the annotated source code 112 for a proof attempt. For example, the verification service may perform each of the verification tasks specified in the verification specification. A proof attempt may be a computing task (or set of computing tasks, e.g., such as the verification tasks) in which one or more specified verification tools are used to check that a specific version of the source code 112 fulfills a proof (e.g., fulfills a set of mathematical proof obligations determined from the source code and the proof associated with the source code). If all of the verification tasks are successful, which means that the proof is confirmed, then verification of the source code 112 is successful and the source code 112 may be marked as verified. Accordingly, the software package that is based on the verified version of the source code may be marked as a verified software package. The verification service 142 may store logs, runtime metrics and/or outputs of verification tasks in the storage service 128.

In embodiments, output information regarding the result of a verification task includes generic information that is generic to a plurality of verification tools and tool specific information that is specific to a particular verification tool. Each proof strategy and/or verification tool may have different types of useful feedback that can be provided. Examples of tool specific information for CBMC, for example, include how many times a constraint solver has been run, the size of problems that are run (e.g., the number of bits in a formula, the number of clauses in a formula, etc.), and so on.

The worker for the automated test execution service 135 may periodically check (e.g., poll) 148 a verification status of the verification of the source code by the verification service 142. This may include sending a query to the verification service 142 and/or sending a query to the storage service 128 to access logs, runtime metrics and/or outputs of verification tasks that have been stored in the storage service 128. Verification service 142 may be polled to determine a status of a proof attempt until the proof attempt completes, for example. If the proof attempt is still in progress, the worker may receive an update that indicates a number of verification tasks that have been completed and/or a number of verification tasks that have not been completed, a verification stage that is currently being performed, specific verification tasks that have or have not been completed, and so on. If any verification task fails, then verification of the version of the source code 112 may fail. If verification fails, the worker for the automated test execution service 135 may generate a notification 150. The notification may be a message (e.g., an email message) and/or a ticket or task to review the source code 112 and correct one or more errors in the source code that caused the proof attempt to fail.

The CI pipeline 115 that includes the verification service 142 may be used to ensure that only verified versions of packages (that include verified source code versions) are used in products. The CI pipeline 115 and/or other processing logic may identify different variants of the same package, and may determine which variant is an authority. The CI pipeline 115 and/or other processing logic may also determine whether a package is a new version of an existing package or whether the package is a variant (e.g., clone or fork) of another package. In one embodiment, a verified status for a package is withdrawn when a new version of the package is generated. Alternatively, the verified status for the package is withdrawn if the latest successfully verified variation is older than a threshold age (e.g., older than a threshold number of days old).

Figure 2:
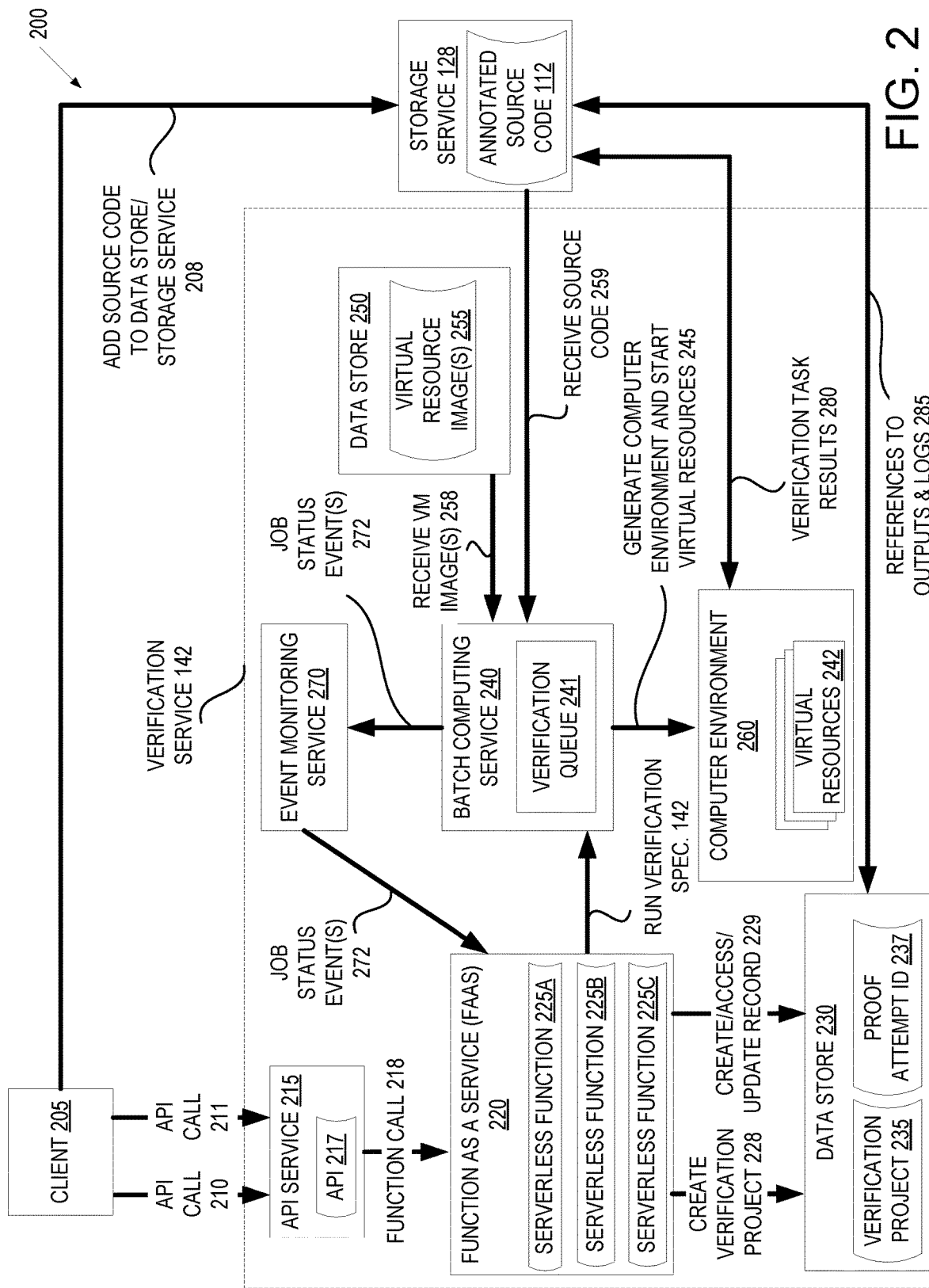
FIG. 2 illustrates an example distributed architecture of a software verification service, in accordance with one embodiment of the present disclosure.

FIG. 2 illustrates an example distributed architecture 200 of a software verification service 142, in accordance with one embodiment of the present disclosure. The verification service 142 may be a cloud-based service that performs verification tasks on the cloud and takes advantage of the natural elastic nature of the cloud. Accordingly, the verification service may run verification tasks on potentially idle resources, and may spin up or instantiate additional resources on demand when the number of verification tasks and/or proof attempts spikes. For example, in the days before a product release, testing may be intense, followed by a lull when the product is released, and the cloud-based nature of the verification service enables users to pay only for the computing resources that are used at any given time, whether those amounts of resources are large or small.

Additionally, the verification service 142 includes built in guarantees of reliability and availability that ensure that the verification service 142 will be available during deadlines. The verification service 142 acts as a state machine that carefully records the state of each verification project and each proof attempt associated with the verification project. Proof attempts may be monitored and recorded at the granularity of individual verification tasks. Accordingly, at any time a proof attempt may be stopped and later restarted, regardless of where the proof attempt is in terms of completed verification tasks and/or stages. Guarantees may also be provided in embodiments that the same combination of verification tools used to process the same verification task will always generate the same result.

The verification service 142 may correspond to verification service 142 of FIG. 1 in embodiments. The verification service 142 may be implemented into a CI pipeline 115 as shown in FIG. 1, or may be a service that can be invoked outside of a CI pipeline. The verification service may be a distributed service that incorporates other services, such as an API service 215, a function as a service (FaaS) 220, a data store 230, a batch computing service 240, a data store 250, and/or an event monitoring service 270.

A client 205 may invoke the verification service 142 by making an API call 210 to an API 217 for the verification service 142 that may be hosted by an API service 215. The API 217 may be a REST API for the verification service 142. For example, the client 205 may make a PUT API call to the API 217 on service 215 to create a verification project. The client 205 may be, for example a worker for an automated test execution service run by a CI pipeline, may be another automated function or entity, or may be a user such as a developer who manually makes the API call to trigger a new proof attempt.

The API call 210 may include information in a body of the request. The information may include a project name for the verification project, a verification specification associated with source code 112 to be verified (e.g., which may be a string encoded in base64), a reference to one or more location in the storage service 128 (e.g., an S3 bucket and key prefix that will be used for temporary storage during a proof attempt, and to store the artifacts and execution logs for each stage of the proof attempt), and/or other information. Additional information included in the request may include one or more resource or account names (e.g., for an identity or role such as an Amazon Resource Name (ARN) for an identity access and management (IAM) role) that will be assumed by one or more components of the verification service 142 during the proof attempt. One role should have permissions to write in the aforementioned location in the storage service 128 for temporary storage. In one embodiment, one role will be assumed by virtual resources 242 that run verification stage commands. This role should have permissions to read one or more files that contain the source code and proof. The source code and proof may be combined together in a single file (e.g., a compressed file such as a zip file) with the source code and the proof, which may be annotated source code 112. The role should also have permissions to read and write in the aforementioned location in the storage service 128 for temporary storage. The roles should also have any additional permissions required by any specific stage commands.

The verification specification may be a specification (e.g., a file such as a YAML file) that specifies how to run a proof. The verification specification may identify source code 112 to be verified (e.g., by providing a universal resource locator (URI) referencing the source code), one or more verification tools to use for verification of the source code 112, configurations for the one or more verification tools, one or more verification tasks to perform in the verification of the source code 112, one or more specific commands (e.g., stage commands) to run for one or more of the verification tasks, and/or parameters for a computer environment to use for the verification of the source code 112. Verification tools may be specified by tool and/or by version and/or patch. Alternatively, or additionally, specific virtual resource images (e.g., Docker container images or virtual machine (VM) images) that include a particular verification tool or set of verification tools may be identified in the verification specification. The verification specification may additionally include a sequence of verification stages, wherein each of the verification stages comprises a different set of verification tasks, and wherein verification tasks in subsequent verification stages may be dependent on the results of verification tasks from previous verification stages. Accordingly, the verification specification may include dependencies between verification tasks (e.g., which verification tasks depend on the results of other verification tasks). In one embodiment, the verification specification includes a directed acyclic graph (DAG) that expresses dependencies between verification tasks. Independent verification tasks (e.g., that are not dependent on the output of other verification tasks that have not been completed) may be executed in parallel. The verification specification may also include other parameters, such as an upper bound on how many resources will be used on verification of the source code 112 (e.g., for a proof attempt).

A verification specification may additionally include a set of default timeouts, including a default proof timeout (e.g., of 40 hours), a default verification stage timeout (e.g., of 5 hours) and/or a default verification task timeout (e.g., of 1 hour). If any of the timeouts is reached, then verification may be retried. Alternatively, a verification failure may be reported. For example, if a stage timeout is exceeded, then a verification stage may be restarted and retried. If a task timeout is exceeded, then the verification task may be restarted and retried. The defaults of the verification specification may additionally include a default operating system image (e.g., "Ubuntu Linux"). Any of the defaults may be replaced with specified values.

A verification specification may additionally include one or more verification stages, and may identify a source code location for one or more of the verification stages. For each verification stage, the verification specification may additionally include one or more commands to run prior to performing a verification task (e.g., such as running scripts, applying patches, and so on). For each verification stage, the verification specification may additionally include a list of one or more artifacts (e.g., such as a build or patch or output artifacts associated with previous stages) to be used to define or set a state for performing a verification task.

The verification specification may additionally indicate one or more verification tools to be used for verification. This may include an indication of one or more virtual resource images to be used. The indication of the virtual resource images may include an ID of the one or more virtual resource images. The verification specification may additionally include a link to a working directory in which data associated with the proof attempt on the source code is to be stored.

FIG. 3 illustrates an example verification specification 302, in accordance with one embodiment of the present disclosure. As shown, the example verification specification 302 may include a version number (e.g., "0.1"). The example verification specification 302 may additionally include an environment (Env) field that may include one or more variables (e.g., such as OpenJML options).

This example verification specification 302 specifies a set of stages (field 'stages') with optional dependencies among them (field 'dependsOn'), and for each stage a virtual resource image to use for the stage, and the commands to run in the stage (field 'commands'). If the virtual resource image to use for a stage is not specified, then it may default to a 'defaults.image' virtual resource image. In some embodiments there is an implicit initial 'FetchSource' stage that downloads an input file (e.g., a compressed file) with the source code 112 and the proof to analyze. This input file may be stored into a data store or storage service 128 (e.g., such as S3), in a scratch location that is used for the proof attempt. Stages with no dependencies may depend implicitly on the 'FetchSource' stage. Stages can optionally declare output artifacts that are stored in the scratch location on the storage service 128. The 'FetchSource' stage may decompress the input file, and has the resulting files as its output artifact. Before running the commands for a stage, the corresponding virtual resource 242 may be setup to download all the artifacts from depending stages to a local file system of a virtual resource 242.

Optionally, stages can specify a paralellism level in the 'partitions' field that is a positive integer, and takes the value of 1 if not specified. If a stage has more than 1 partition then it may also have a 'groupingCommands' field that specifies how to split input files into tasks. Each line printed by the last command in 'groupingCommands' may correspond to a path in the local file system of the virtual resource 242. Each path is assigned to a partition, using a uniform distribution, and the files for that partition are uploaded to the scratch location. After this grouping phase, the system may spawn virtual resources 242 for each partition, as described in greater detail below, and the virtual resource 242 corresponding to each partition may be setup to download the files for that partition before running the commands for the stage, specified in the 'commands' field.

Referring back to FIG. 2, prior to making the API call 210 or after making the API call 210, the client 205 may add the annotated source code 112 to storage service 128. The annotated source code 112 may include a proof associated with the source code. The annotated source code 112 may be stored in a location at the storage service 128 that is accessible by one or more roles specified in the request of the API call.

The API service 215 (e.g., Amazon API Gateway) may be a service that handles API calls. The API service makes it easy for developers to create, publish, maintain, monitor, and secure APIs at any scale. The API service 215 may host a generic API for the verification service 142 that acts as a "front door" for the verification service 142 to enable users to access data, business logic, or functionality of the verification service 142, such as workloads running on computer environment 260, code running on the FaaS 220, data on the storage service 128 and/or data store 230, and so on. The API service 215 handles all the tasks involved in accepting and processing API calls to the verification service 142, including traffic management, authorization and access control, monitoring, and API version management.

The API service 215 may include a generic API for the verification service 142. The generic API may be usable with any combination of verification tools, for any source code. The verification tools may include formal verification tools and/or may include other types of verification tools, such those discussed above. Accordingly, the same API may be used to start a verification of a C # source code using a first modeling language and a first SMT solver and to start a verification of a Java source code using a second modeling language and a second SMT solver. The API service 215 may expose a Representational State Transfer (REST) API for the verification service 142 in embodiments. The call 210 to the API 217 may include a verification specification or a reference to a verification specification.

Responsive to receiving API call 210 from client 205, the API 217 makes a function call 218 to FaaS 220 to resolve the request. The FaaS 220 may include multiple serverless functions 225A-C. The function call 218 may be a call to one or more serverless functions (e.g., serverless function 225A) running on the FaaS 220. Serverless functions (also known as agile functions and nimble functions) include functions that depend on third-party services (e.g., such as a backend as a service (BaaS)) or on custom code that is run in an ephemeral container (e.g., a function as a service (FaaS) such as Amazon Web Services (AWS) Lambda). An AWS Lambda function (or other FaaS function) can be triggered by other services (e.g., such as API service 215) and/or called directly from any web application or other application.

Serverless function 225A may create 228 a record for a verification project 235 for the annotated source code 112 in a data store 230. The data store 230 may be a database, such as a non-relational NoSQL database (e.g., DynamoDB or Aurora). The verification project 235 may include a unique ID and/or other metadata for the verification project.

After the verification project has been created, the client 205 may make a second API call 211 to the API service 215 to launch a proof attempt. The second API call 211 may be, for example, a POST request to the API 217. The second API call 211 may include in a body of the request the location in the storage service 128 where the annotated source code 112 (e.g., source code and proof code) were previously stored, the project name for the verification project, and/or a revision identifier (e.g., which may be an arbitrary revision identifier).

Responsive to receiving the second API call 211 from client 205, the API 217 makes a function call 218 to FaaS 220 to resolve the request. The function call 218 may call serverless function 225A or another serverless function (e.g., serverless function 225B). The serverless function 225A-B may retrieve project information for the verification project 235 from the data store 230. The serverless function 225A-B may additionally generate 229 a new proof attempt ID 237 for the combination of the verification project 235 and the revision of the source code. Additionally, the serverless function 225A-B may transform the verification specification into a set of requests to a batch computing service 240, that launch several batch jobs (e.g., verification tasks), with dependencies among them, that will run the proof attempt as specified in the verification specification. The serverless function 225A-B may additionally store information about the new proof attempt in data store 230. The information may be stored in a table in the data store 230 that is associated with the proof attempt ID 237 and/or the verification project 235. Serverless function 225A-B may additionally update an additional table in the data store 230 that maintains a mapping from IDs for the batch jobs to proof attempts. This mapping may later be used to process batch job state change events.

The serverless function 225A-B may return an identifier associated with the new proof attempt ID 237 for the proof attempt that is running. The identifier may be identified by the tuple (verification project name, revision, proof attempt ID). The API service 215 may then forward that proof attempt information to the client 205, as a response to the API call 211 (e.g., the POST request).

The batch computing service 240 may be a cloud-based service that enables hundreds to thousands of batch computing jobs to be run on virtual resources easily and efficiently. One example of a batch computing service 240 is Amazon Web Services (AWS) Batch. The batch computing service 240 may dynamically provision an optimal quantity and type of compute resources (e.g., central processing unit (CPU) and/or memory optimized instances) based on the volume and/or specific resource requirements of batch jobs.

The batch computing service 240 determines a computer environment 260 to create based on the verification specification. The computer environment 260 may include a number of machines to use as well as an amount of processing resources and/or memory resources to use for each of the machines. The machines that are included in a computer environment may be physical machines and/or virtual machines. The batch computing service 240 may then generate 245 the computer environment 260. The batch computing service 240 may then launch one or more batch jobs (e.g., verification tasks) corresponding to the various stages in the verification specification, according to their dependencies.

As mentioned, the verification specification may indicate one or more verification tools to use to verify the source code 112 (e.g., to perform a proof attempt). The batch computing service 240 may search a data store 250 to identify from a set of available resource images 255 (e.g., Docker container images or VM images) virtual resource images that include the indicated one or more verification tools. The virtual resource images 255 may be, for example AWS Docker container images in some embodiments. The data store 250 may be, for example, a registry of Docker containers or other virtual operating systems (e.g., such as the AWS Elastic Container Registry (ECR)). Traditional VMs generally have a full operating system (OS) with its own memory management installed with the associated overhead of virtual device drivers. In a virtual machine, valuable resources are emulated for the guest OS and hypervisor, which makes it possible to run many instances of one or more operating systems in parallel on a single machine (or host). Every guest OS runs as an individual entity from the host system. On the other hand, Docker containers are executed with a Docker engine rather than a hypervisor. Containers are therefore smaller than VMs and enable faster start up with better performance, less isolation and greater compatibility possible due to sharing of the host's kernel. Docker containers are able to share a single kernel as well as application libraries. VMs and Docker containers may also be used together in some embodiments.

The virtual resource images 255 may include virtualized hardware and/or a virtualized operating system of a server. Accordingly, the terms virtual resource may include both traditional virtualization of hardware such as with VMs and/or virtualization of operating systems such as with a Docker container. Virtual resource images 255 may include a set of preconfigured and possibly curated virtual resource images that include common combinations of verification tools. Virtual resource images 255 may additionally include custom virtual resource images that include custom combinations of verification tools (e.g., including rarely used verification tools, custom verification tools, older versions of verification tools, and so on). Client 205 may store one or more custom virtual resource images in the data store 250.

The batch computing service 240 may then select one or more of the virtual resource images 255 that include the specified verification tools, and receive 258 those selected virtual resource images. The batch computing service 240 may then generate 245 one or more virtual resources 242 (e.g., VMs and/or Docker containers) using the received virtual resource images. The virtual resources 242 may run in the generated computer environment 260 and/or be part of the generated computer environment 260. When a batch job is launched, the identified virtual resource image associated with a particular stage of the verification may be downloaded from data store 250 and used to instantiate a virtual resource 242.

The batch computing service 240 may receive 259 the annotated source code 112. The batch computing service 240 may generate an object model of a verification stack based on the verification specification and/or the source code, wherein the verification stack includes multiple verification stages. Each of the verification stages may include a different set of verification tasks. Verification tasks in subsequent verification stages may be dependent on the results of verification tasks from previous verification stages. Different virtual resource images may be used to generate different virtual resources 255 for one or more distinct verification stages. Alternatively, the same virtual resource images 255 may be used for multiple verification stages. Batch computing service 240 may generate a verification queue 241, and may add the verification tasks for a current verification stage to the verification queue 241.

Batch jobs executing on virtual resources 242 may run the commands for verification stages in the verification specification. The virtual resources 242 may each select verification tasks from the verification queue 241 and perform the verification tasks using the verification tools running on the virtual resources 242. Each of the verification tasks may be associated with a particular feature or portion of the source code 112. Verification tasks may include, for example, a portion or feature of source code as well as a portion of a proof (e.g., specification information) associated with the portion of the source code.

To complete a verification task, a verification tool executing on a virtual resource 242 may perform one or more verification operations. For example, for a formal verification operation, mathematical proof obligations for a portion or feature of the source code may be identified and provided to a verification tool (e.g., an SMT solver) to verify that the one or more mathematical proof obligations are met. The SMT solver (or other verification tool) may then determine whether the one or more mathematical proof obligations are true. For example, if all the proof obligations can be demonstrated to be true, then the feature or portion of the source code can be claimed to be verified. Results of execution of a verification task may include output artifacts, logs, runtime metrics and/or other metadata. Output artifacts may together define a state of the source code that may be used to perform other verification tasks.

As a verification task is completed, a virtual resource 242 may store 280 results of the verification task (e.g., including output artifacts, logs, runtime metrics, other metadata, etc.) in the storage service 128. The virtual resource 242 may then select another verification task from the verification queue 241. When all of the verification tasks in the verification queue associated with a verification stage are complete, the verification tasks from a next verification stage may be added to the verification queue 241. Accordingly, in embodiments any verification tasks that are included in the same verification stage may be run in parallel. However, verification tasks that are not in the same verification stage may not be run in parallel. This enables verification tasks from subsequent verification stages to be run using a starting state based on output artifacts produced by the running of verification tasks in previous verification stages. For verification tasks that depend on a particular state of execution of the source code 112, virtual resources 242 may access output artifacts from the storage service 128 to implement that state prior to performing the verification task.

When a batch job (e.g., a verification task) changes its state, a rule in event monitoring service 270 configured to listen for events in the batch computing service 240 may trigger a serverless function 225C that updates the table in the data store 230 that contains information for the corresponding proof attempt (e.g., using the information that maps batch job IDs to proof attempts to locate the proof attempt).

Event monitoring service 270 receives job status events 272 from the batch computing service 240 and/or directly from virtual resources 242. Event monitoring service may be a cloud-based service such as AWS CloudWatch Events. The event monitoring service 270 may use simple rules that match events and route them to one or more target functions or streams (e.g., to a serverless function 225B). The event monitoring service 270 may also schedule self-automated actions that self-trigger at certain times (e.g., if a job status event has not been received for a threshold amount of time). Job status events can be events for an entire proof attempt, events for a verification stage, and/or events for one or more specific verification tasks. Each verification task may have a status of running, a status of timed out or a status of failure. Event monitoring service 270 may then provide the one or more job status events 272 to the FaaS 220. In one embodiment, the event monitoring service 270 calls serverless function 225B and provides to the serverless function 225B the one or more job status events 272. The serverless function 225B may then update 228 the record 235 of the proof/verification attempt based on the job status events 272.

At any time, client 205 may call the API service 215 (e.g., with a GET REST command) requesting a status of a particular proof attempt for a version of source code associated with a package. The API service 215 may then call another serverless function, which may then issue a request to the data store 230 to obtain a status update of the proof attempt. The serverless function may then provide the status update to the client 205. For example, at any moment the client 205 can send a GET request to the API 217, to query the state of the proof attempt. The client 205 may provide the verification project name, revision, and proof attempt ID in the API call. The request may be resolved by API service 215 by calling serverless function 225C that fetches the state of the proof attempt from the corresponding table in data store 230, and may return it serialized as JSON, which the gateway service 215 may then forward to the client 205 as the response. The client 205 can also send a PUT request to the API 217 for the verification service 142, to cancel a running proof attempt.

A record ID and/or status information such as references to outputs of verification tasks and/or logs may be coordinated between data store 230 and storage service 128.

Verification service 142 may be a multitenant service that can perform verification attempts for multiple different clients in parallel. Additionally, verification service 142 may perform verification attempts on multiple different versions or revisions of source code for the same program or project in parallel and/or at different times. For example, a client 205 may launch several proof attempts in parallel for different proof versions and/or different source code versions and/or using different verification tools.

The verification service 142 removes the overhead of setting up verification tools, provisioning hardware, and supervising the proof execution on a distributed computing environment, while maintaining a record of the verification state of each revision of source code. Software developers and verification engineers can focus on developing the source code and the proof, while the verification service takes care of rechecking the proof on each new revision of the code and notifying affected parties.

In some embodiments, the verification service 142 may perform a proof attempt for one or more features or portions of source code rather than for the entire source code. For example, verification service 142 may perform a proof attempt of one or more methods of the source code. In such an implementation, the verification specification may specify the one or more portions or features (e.g., methods) for which the verification will be performed. Individual portions or features of the source code that have been verified may then be marked as having been verified. This enables a developer to run proof attempts on portions of code as the code is written.

In some embodiments, an annotated source code may include multiple different proofs. In such embodiments, the verification specification may indicate a specific proof to use for verification of the source code. Alternatively, separate proof attempts may be performed for each proof. In one embodiment, source code includes multiple proofs, where one proof depends on another proof. For example, with OpenJML a proof for source code might depend on the proof for the specifications of other source code packages that are dependencies of the source code. In such an instance, verification service 142 may further include a dependency management service (not shown) that can determine whether any proof in a chain of dependent proofs has failed in a proof attempt. If any proof in a chain of proof dependencies fails, then verification for the associated source code may fail.

FIGS. 4-8 are flow diagrams showing various methods for performing verification of source code for a program or project, in accordance with embodiments of the disclosure. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by one or more computing devices executing components of a verification service. The methods may be performed by processing logic of components of a verification service in some embodiments.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 4:
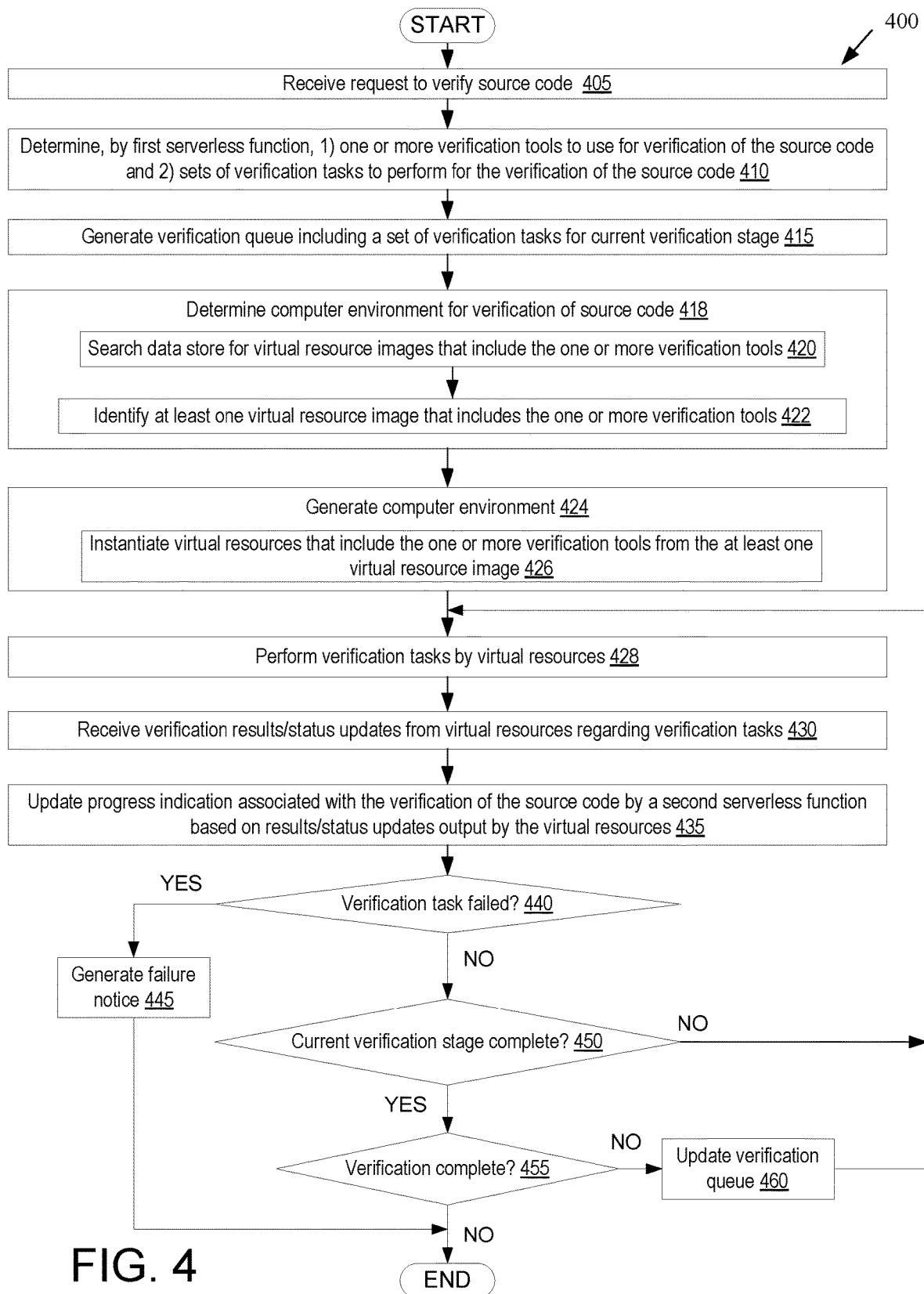
FIG. 4 depicts a flowchart illustrating one embodiment for a method of verifying software using a distributed software verification service.

FIG. 4 depicts a flowchart illustrating one embodiment for a method 400 of verifying software using a distributed software verification service. At block 405 of method 400, processing logic (e.g., API service 215) receives a request to verify source code. The request may include a verification specification. At block 410, processing logic invokes a first serverless function (e.g., serverless function 225A), which determines one or more verification tools to use for verification of the source code and a set of verification tasks to perform for the verification of the source code. In one embodiment, to determine the set of verification tasks, the serverless function accesses a data store at which information for the set of verification tasks is stored. The first serverless function may also generate a proof attempt record ID associated with the verification of the source code.

At block 415, the first serverless function calls additional processing logic (e.g., batch computing service 240) with a request to run the verification specification. The additional processing logic may generate a verification queue including the set of verification tasks for a current verification stage. Verification of the source code may be divided into multiple verification stages, and some or all verification tasks from the same verification stage may be performed in parallel. The additional processing logic may additionally determine a computer environment for the verification of the source code from the verification specification. The computer environment may include one or more hardware devices and/or one or more VMs. Each of the hardware devices and/or VMs may include a designated amount of computing resources and/or a designated amount or memory resources.

The additional processing logic may additionally search a data store for virtual resource images that include the one or more verification tools specified in the verification specification. The verification specification may identify specific virtual resource images by ID or may search metadata associated with the stored virtual resource images to identify one or more virtual resource image that includes the specified verification tools. At block 422, the additional processing logic may identify at least one virtual resource image that includes the one or more verification tools. The operations of blocks 420 and 422 may be performed as part of determining the computer environment or as separate processes after the computer environment has been determined and/or generated.

At block 424, the additional processing logic generates the computer environment. This may include provisioning one or more hardware devices and/or VMs that have the designated amount of processing resources and/or memory resources. At block 426, processing logic may instantiate one or more virtual resources (e.g., VMs and/or Docker containers) that include the one or more verification tools from the at least one virtual resource image. The instantiation of the virtual resources may be performed as part of generating the computer environment 424 or may be performed after the computer environment has been generated.

At block 428, each of the virtual resources may perform one or more verification tasks from the verification queue. During a verification stage, virtual resources may select verification tasks, perform the verification tasks, and then output results of the verification tasks. This may be repeated until all of the verification tasks from a stage are complete. Then verification may progress to a next verification stage, and the verification tasks for that verification stage may be performed. This process may continue until all of the verification tasks for all verification stages have been completed or a failure occurs. As verification tasks are completed, virtual resources may write results of the verification tasks to a data store.

For some verification tasks, there may be multiple different options or states to be tested. In such instances, a single verification task may be subdivided into multiple verification tasks, where each of the verification tasks may test a specific option or set of options. This may enable such verification tasks that have multiple options to be broken up into smaller tasks that can be parallelized (e.g., by assigning the subtasks to different virtual resources, which may perform the subtasks in parallel). In an example, a communication protocol to be tested may include multiple different opcodes that might be included in a header.

At block 430, additional processing logic (e.g., event monitoring service 270) receives verification results and/or status updates from the virtual resources regarding the verification tasks. Alternatively, or additionally, the additional processing logic may receive the verification results and/or status updates from a data store (e.g., a storage service) and/or from other processing logic (e.g., batch computing service 240).

The additional processing logic may invoke a second serverless function (e.g., serverless function 225B), and provide the second serverless function with one or more updates. The second serverless function may then update a progress indication associated with the identification of the source code based on the results and/or updates output by the virtual resources.

At block 440, additional processing logic determines whether a verification task has failed. If a verification task has failed, then one or more retries may be performed for the verification task. If those retries also fail (or if retries are not permitted), then the method continues to block 445, and a failure notice is generated. If no verification tasks have failed, the method continues to block 450.

At block 450, additional processing logic may determine whether a current verification stage is complete. If not, the method returns to block 428, and one or more verification tasks for the first verification stage are performed. If the current verification stage is complete, then the method continues to block 455. At block 455, additional processing logic determines whether the verification is complete. If the verification is complete, the method ends. If the verification is not complete, the method continues to block 460, at which verification advances to a next verification stage and the verification queue is updated with verification tasks for the next verification stage. The method then returns to block 428 and the virtual resources perform verification tasks for the next verification stage. This process continues until a failure occurs or all verification tasks are complete.

Figure 5:
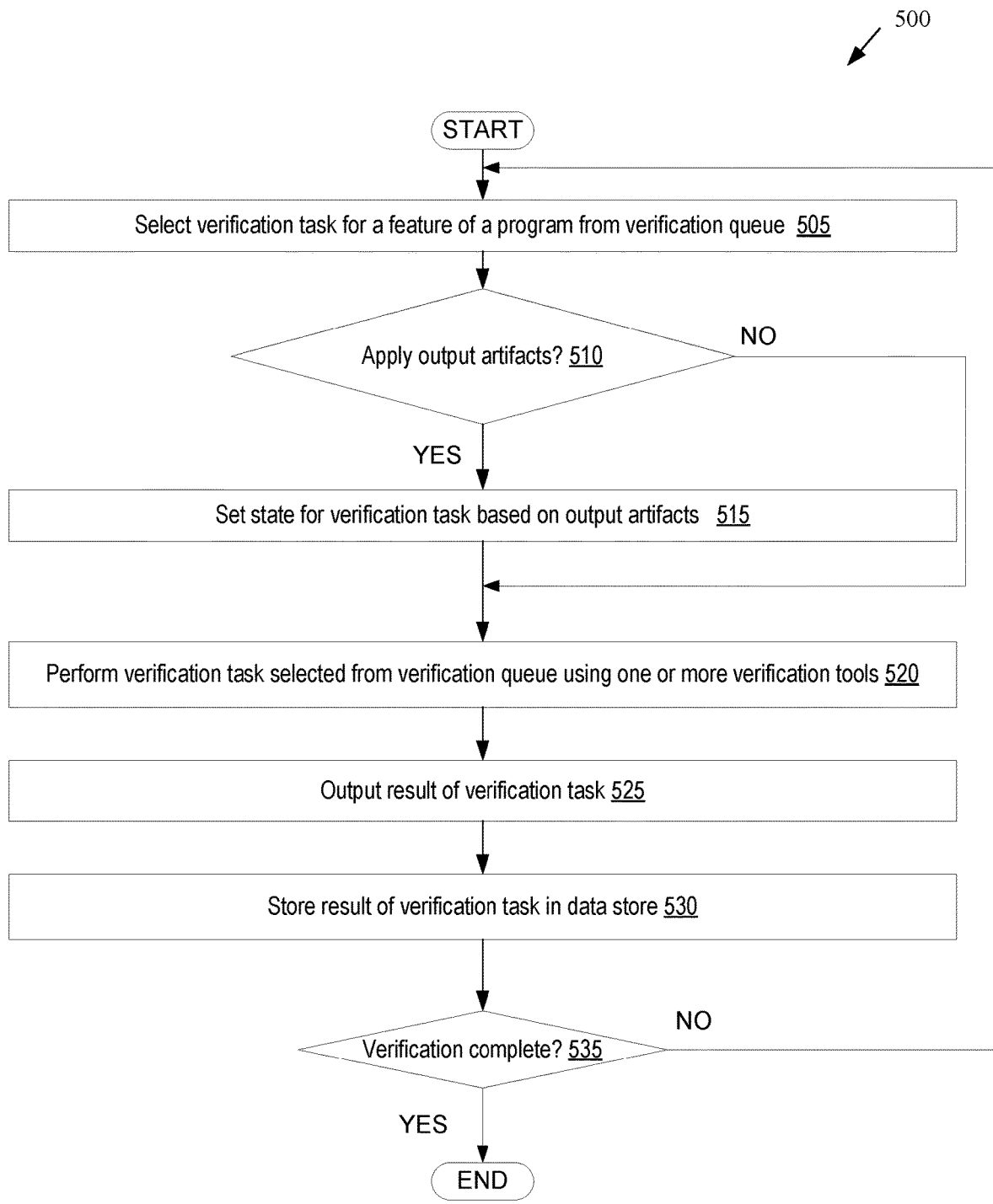
FIG. 5 depicts a flowchart illustrating one embodiment for a method of performing one or more verification tasks by a virtual resource.

FIG. 5 depicts a flowchart illustrating one embodiment for a method 500 of performing one or more verification tasks by a virtual resource. Method 500 may be performed by virtual resources, for example, at block 428 of method 400. At block 505 of method 500, processing logic (e.g., a virtual resource such as a Docker container or a VM) selects a verification task for a feature of a program from a verification queue.

At block 510, processing logic determines whether to apply any output artifacts and/or execute any commands such as scripts and/or patches prior to performing the selected verification task. Output artifacts may have been generated based on completion of verification tasks associated with a prior verification stage, for example, and may define a starting state for performing a current verification task. If no output artifacts are to be applied and no commands are to be executed, the method proceeds to block 520. If output artifacts are to be applied and/or commands are to be executed, the method continues to block 515. At block 515, state of the source code is set based on the output artifacts and/or based on executing the one or more commands. The method then continues to block 520.

At block 520, processing logic performs the verification task selected from the verification queue using one or more verification tools. At block 525, processing logic outputs a result of the verification task. The output result may include runtime metrics, a failure or success, output artifacts, metadata, logs and/or other information. At block 530, processing logic may store some or all of the results of the verification task (e.g., one or more output artifacts) in a data store (e.g., a cloud-based storage service), which may also store an annotated version of the source code.

At block 535, processing logic determines whether verification of the source code for the program is complete. If so, the method ends. If verification is not complete, then the processing logic may return to block 505 and select another verification task from the verification queue.

Figure 6:
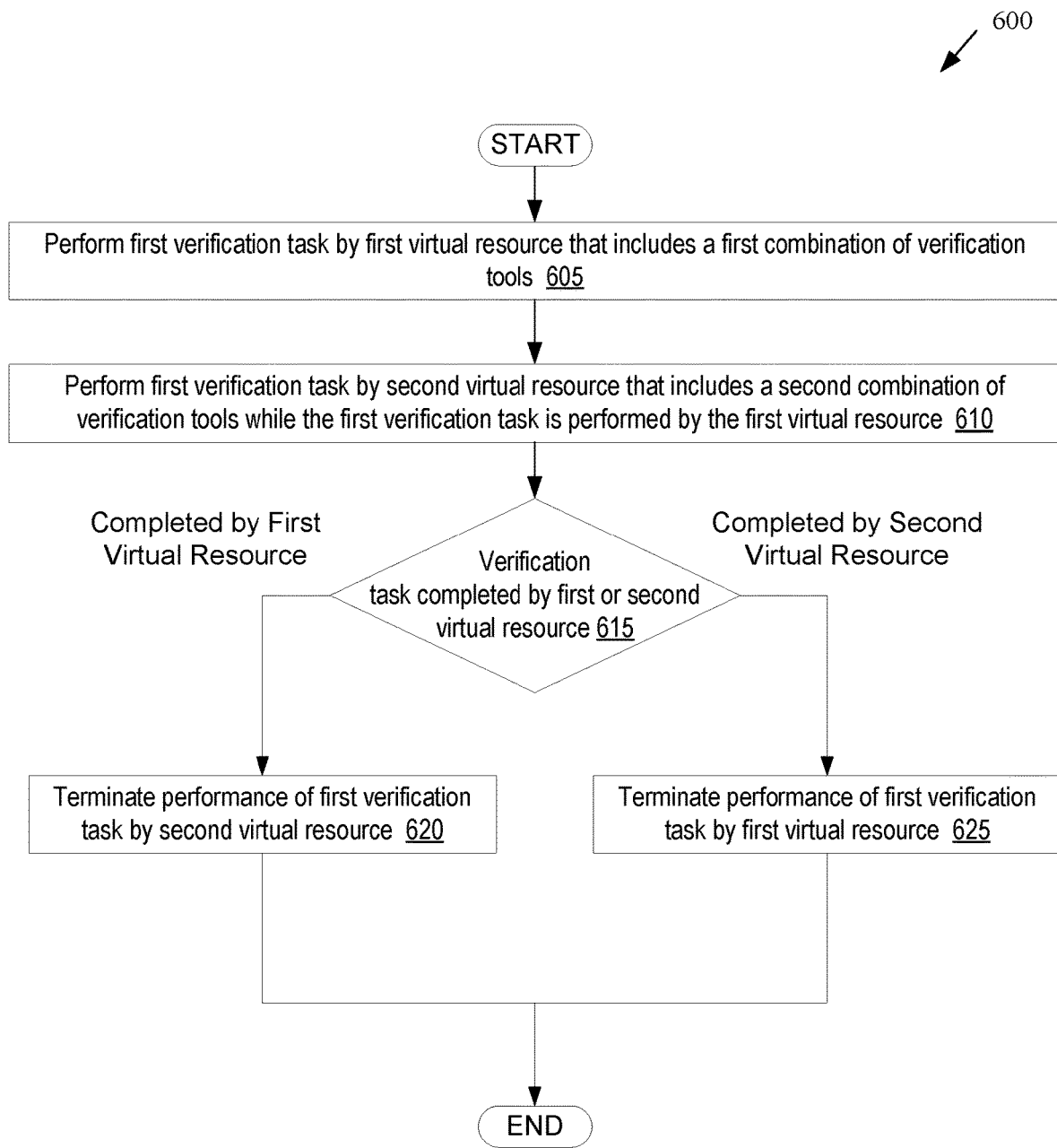
FIG. 6 depicts a flowchart illustrating one embodiment for a method of performing a verification task by multiple different virtual resources in parallel.

FIG. 6 depicts a flowchart illustrating one embodiment for a method 600 of performing a verification task by multiple different virtual resources in parallel. At block 605 of method 600, a first virtual resource (e.g., first VM or Docker container) performs a first verification task. The first resource may include a first combination of verification tools. At block 610, a second virtual resource (e.g., second VM or Docker container) also performs the first verification task. The second virtual resource may include a second combination of verification tools that differs from the first combination of verification tools. For example, the second resource may include different versions of the same verification tools, or entirely different verification tools. Alternatively, the second virtual resource may use the same verification tools, but may run one or more commands such as scripts or patches prior to performing the first verification task. Alternatively, the second virtual resource may use the same verification tools, but may apply different configuration settings for the verification tools. In an example, there may be two ways to solve a problem specified in the annotated source code. The first way to solve the problem may be more reliable, but may take a long time to complete. The second way to solve the problem may work in only a small number of instances, but may work very quickly in those instances in which it does solve the problem. The first virtual resource may perform the verification task by attempting to solve the problem using the first technique, and the second virtual resource may perform the verification task by attempting to solve the problem using the second technique.

At block 615, processing logic determines whether the verification task has been completed by the first virtual resource or the second virtual resource. If the first virtual resource completes the first verification task, then the method continues to block 620, and the performance of the first verification task is terminated by the second virtual resource. On the other hand, if the second virtual resource completes the first virtualization task, then the method continues to block 626, and the performance of the first virtualization task is terminated by the first virtual resource.

Figure 7:
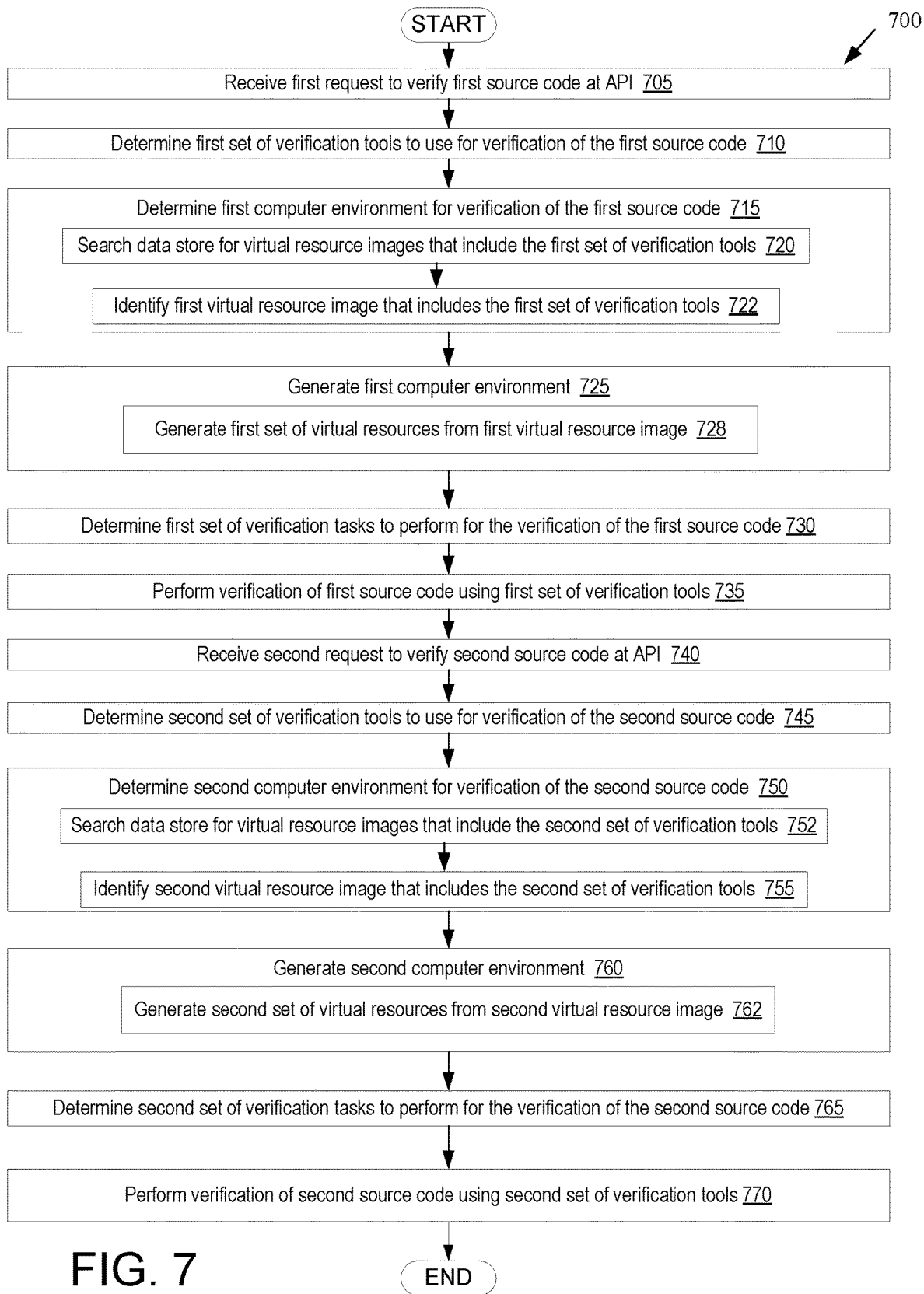
FIG. 7 depicts a flowchart illustrating one embodiment for a method of performing software verification of source code for two different programs using different sets of verification tools using a generic software verification application programming interface (API).

FIG. 7 depicts a flowchart illustrating one embodiment for a method 700 of performing software verification of source code for two different programs using different sets of verification tools using a generic software verification application programming interface (API). At block 705 of method 700, processing logic receives a first request to verify first source code at an API (e.g., at API service 215). The first request may include a first verification specification. At block 710, processing logic determines a first set of verification tools to use for verification of the first source code. At block 715, processing logic determines a first computer environment for verification of the first source code based on a first verification specification included in the first request. At block 720, processing logic may also search a data store for virtual resource images that include the first set of verification tools. At block 722, processing logic may identify a first virtual resource image that includes the first set of verification tools. The operations of blocks 720 and 722 may be performed as part of determining the first computer environment or after the first computer environment has been determined and/or generated.

At block 725, processing logic generates the first computer environment. At block 728, processing logic generates a first set of virtual resources from the first virtual resource image. The first set of virtual resources may execute in the generated computer environment in embodiments.

At block 730, processing logic determines a first set of verification tasks to perform for the verification of the first source code based on a first verification specification included in the first request. At block 735, processing logic performs verification of the first source code using the first set of verification tools running on the first set of virtual resources.

At block 740 of method 700, processing logic receives a second request to verify second source code at the API. The second request may include a second verification specification. At block 745, processing logic determines a second set of verification tools to use for verification of the second source code based on a second verification specification included in the second request. The second set of verification tools may be different from the first set of verification tools.

At block 750, processing logic determines a second computer environment for verification of the second source code based on the second verification specification included in the second request. The second computer environment may have a different number of physical and/or virtual machines, may have a different amount of memory resources, and/or may have a different amount of processing resources from the first computer environment. At block 752, processing logic may also search the data store for virtual resource images that include the second set of verification tools. At block 755, processing logic may identify a second virtual resource image that includes the second set of verification tools. The operations of blocks 752 and 755 may be performed as part of determining the second computer environment or after the second computer environment has been determined and/or generated.

At block 760, processing logic generates the second computer environment. At block 762, processing logic generates a second set of virtual resources from the second virtual resource image. The second set of virtual resources may execute in the second generated computer environment in embodiments.

At block 765, processing logic determines a second set of verification tasks to perform for the verification of the second source code. At block 770, processing logic performs verification of the first source code using the second set of verification tools running on the first set of virtual resources.

Method 700 shows that a single generic API may be used to perform automated software verification using any combination of underlying verification tools.

Figure 8:
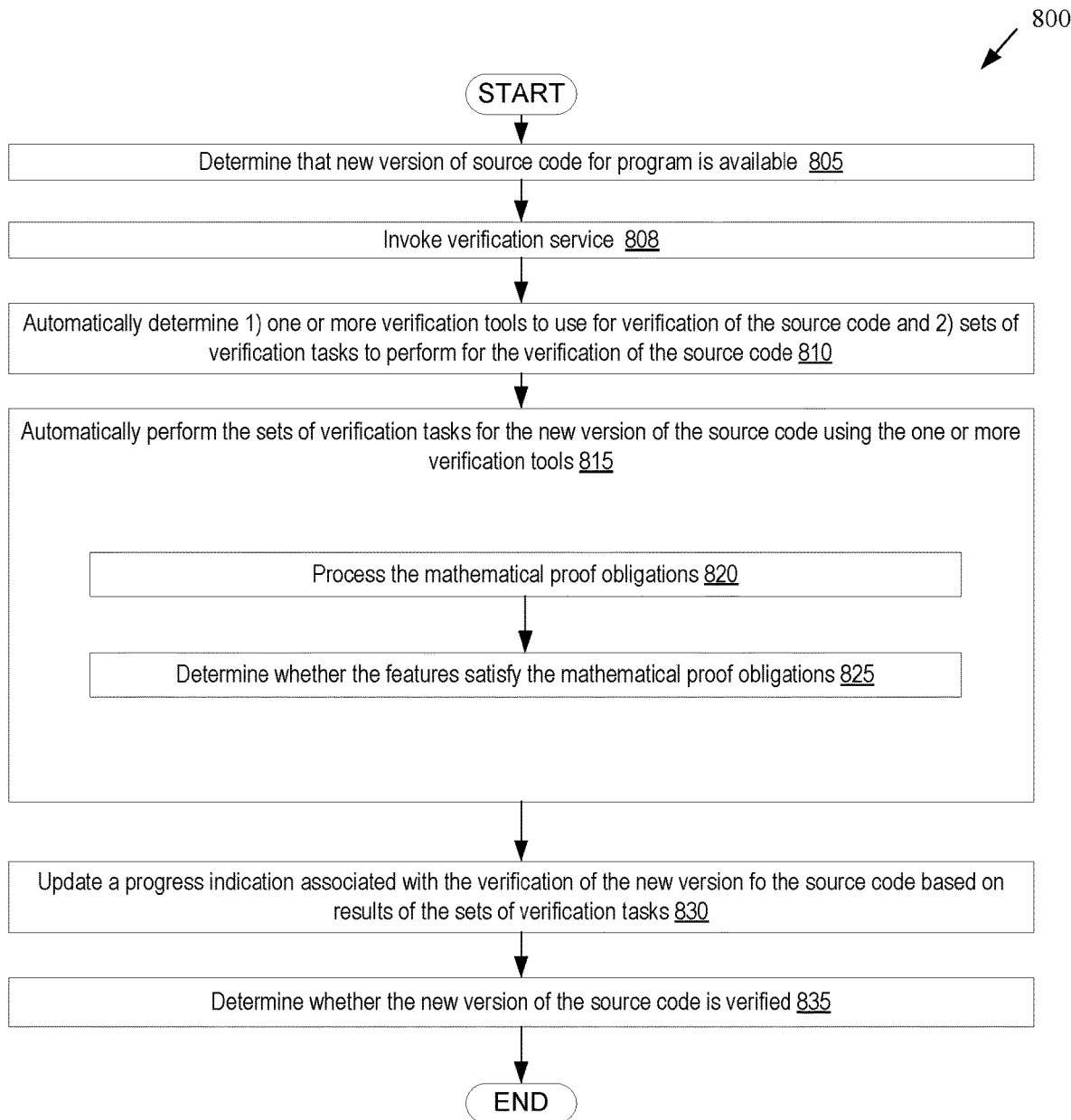
FIG. 8 depicts a flowchart illustrating one embodiment for a method of automatically verifying software using a continuous integration pipeline that includes an automated software verification service.

FIG. 8 depicts a flowchart illustrating one embodiment for a method 800 of automatically verifying software using a CI pipeline (e.g., CI pipeline 115) that includes an automated software verification service.

At block 805 of method 800, processing logic determines that a new version of source code is available (e.g., based on the new version of the source code being checked in to a Git repository). Processing logic then invokes a verification service responsive to detecting that the new version of the source code is available at block 808. At block 810, processing logic (e.g., the verification service) automatically determines one or more verification tools to use for verification of the source code and additionally determines one or more sets of verification tasks to perform for verification of the source code. Such information may be determined from a verification specification associated with the source code.

At block 815, processing logic (e.g., the verification service) automatically performs one or more sets of verification tasks for the new version of the source code using the one or more verification tools that were identified. Performing a verification task may include processing one or more mathematical proof obligations for a feature of the source code at block 820 (e.g., using an SMT solver). At block 825, processing logic may determine whether the feature satisfies the mathematical proof obligations (e.g., based on an output of the SMT solver).

At block 830, processing logic (e.g., the verification service) updates a progress indication associated with the verification of the new version of the source code based on results of the first sets of verification tasks. At block 835, processing logic (e.g., the verification service) determines whether the new version of the source code is verified. If all of the verification tasks are successful, then the software is verified. If one or more verification tasks fails, then the software may not be verified and a failure notice may be generated.

Figure 9:
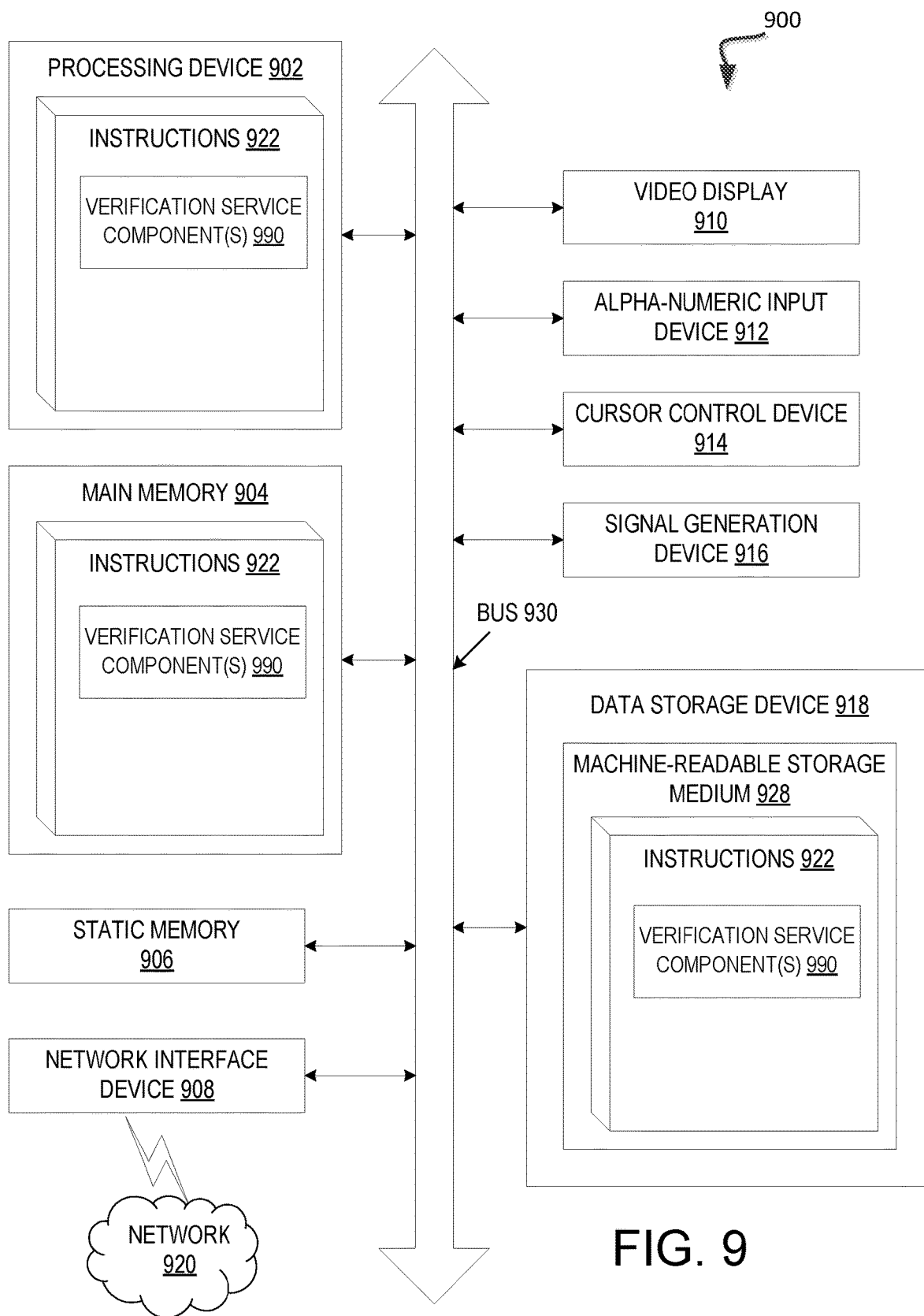
FIG. 9 is a schematic block diagram that provides one example illustration of a computing device executing one or more components of a software verification service, according to one embodiment of the present disclosure.

FIG. 9 illustrates a diagrammatic representation of a machine in the exemplary form of a computer system (computing device) 900 within which a set of instructions, for causing the machine to perform any one or more of the methodologies discussed herein, may be executed. The system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (e.g., a processor) 902, a main memory device 904 (e.g., read-only memory (ROM), flash memory, dynamic random access memory (DRAM) such as synchronous DRAM (SDRAM)), a static memory device 906 (e.g., flash memory, static random access memory (SRAM)), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute instructions for one or more components 990 of a software verification service for performing the operations discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a computer-readable storage medium 928 on which is stored one or more sets of instructions of components 990 for the software verification service embodying any one or more of the methodologies or functions described herein. The instructions may also reside, completely or at least partially, within the main memory 904 and/or within processing logic of the processing device 902 during execution thereof by the computer system 900, the main memory 904 and the processing device 902 also constituting computer-readable media.

While the computer-readable storage medium 928 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory computer-readable medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions using terms such as "receiving", "processing", "combining", "verifying", "determining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Accordingly, it will be appreciated that a variety of programming languages, specification languages and/or verification tools may be used to implement the teachings of the embodiments of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method of using a distributed verification service to coordinate verification activity of source code, comprising:
   receiving a request to verify the source code for a program;
   determining, by a first serverless function, one or more verification tools to use for verification of the source code;
   determining, by the first serverless function, a plurality of verification tasks to perform for the verification of the source code;
   generating a queue comprising the plurality of verification tasks;
   instantiating a plurality of virtual resources comprising the one or more verification tools;
   for one or more virtual resources of the plurality of virtual resources, performing the following actions:
      selecting a verification task for a feature of the program from the queue;
      performing the verification task selected from the queue using the one or more verification tools; and
      outputting a result of the verification task;
   performing a first verification task by a first virtual resource comprising a first combination of verification tools;
   performing the first verification task by a second virtual resource comprising a second combination of verification tools while the first verification task is performed by the first virtual resource;
   determining that the first verification task has been completed by a first one of the first virtual resource and the second virtual resource; and
   terminating the performance of the first verification task by a second one of the first virtual resource and the second virtual resource; and
   updating a progress indication associated with the verification of the source code by a second serverless function based on results output by the one or more virtual resources.

2. The method of claim 1, wherein the plurality of verification tasks are for a first verification stage and can be performed in parallel, and wherein results output by the one or more virtual resources together comprise one or more output artifacts that in combination define an operating state of the source code at an end of the first verification stage, the method further comprising:
   storing the one or more output artifacts in a data store;
   after the plurality of verification tasks in the queue are complete, adding a new plurality of verification tasks to the queue for a second verification stage; and
   for the one or more virtual resources of the plurality of virtual resources, performing the following comprising:

selecting a new verification task for a next feature of the program from the queue, wherein the new verification task depends on the operating state of the source code;

performing the new verification task selected from the queue using the one or more verification tools and the operating state of the source code; and outputting a new result of the new verification task.

3. The method of claim 1, further comprising:

determining a computer environment for the verification of the source code from at least one of the request or configuration information referenced in the request; and generating the computer environment for the verification of the source code, wherein the computer environment comprises memory resources, processing resources, and a number of hardware instances comprising the memory resources and the processing resources.

4. The method of claim 1, further comprising:

searching a data store for virtual resource images comprising the one or more verification tools; and identifying at least one virtual resource image comprising the one or more verification tools, wherein the one or more virtual resources are instantiated from the at least one virtual resource image.

5. A system comprising:

one or more memory devices; and one or more processing devices, wherein each of the one or more processing devices is operatively coupled to at least one of the one or more memory devices, wherein the one or more processing devices are configured to:

detect that a new version of source code for a program is available;

responsive to detection that the new version of the source code is available, invoke a verification service;

automatically determine, via the verification service, one or more verification tools to use for verification of the new version of the source code from a verification specification associated with the source code;

automatically determine, via the verification service, a plurality of verification tasks to perform for the verification of the new version of the source code from the verification specification associated with the source code;

generate a queue comprising the plurality of verification tasks;

instantiate a plurality of virtual resources comprising the one or more verification tools;

for one or more virtual resources of the plurality of virtual resources, perform the following actions:

select a verification task for a feature of the program from the queue;

perform the verification task selected from the queue using the one or more verification tools; and output a result of the verification task;

automatically perform, via the verification service, the plurality of verification tasks for the new version of the source code using the one or more verification tools;

perform a first verification task by a first virtual resource comprising a first combination of verification tools;

perform the first verification task by a second virtual resource comprising a second combination of verification tools while the first verification task is performed by the first virtual resource;

determine that the first verification task has been completed by a first one of the first virtual resource and the second virtual resource; and terminate the performance of the first verification task by a second one of the first virtual resource and the second virtual resource; and determine, via the verification service, whether the new version of the source code is verified.

6. The system of claim 5, wherein the one or more processing devices are further configured to:

update a progress indication associated with the verification of the new version of the source code based on results output by the one or more virtual resources.

7. The system of claim 5, wherein the one or more virtual resources of the plurality of virtual resources are further configured to perform the following comprising:

generate one or more output artifacts responsive to performing the verification task; and store the one or more output artifacts in a data store, wherein the one or more output artifacts are used to set a starting state for one or more further verification tasks.

8. The system of claim 5, wherein the one or more processing devices are further configured to:

generate an object model of a verification stack, wherein the verification stack comprises a plurality of verification stages, wherein each of the verification stages comprises a different plurality of verification tasks, and wherein verification tasks in subsequent verification stages are dependent on the results of verification tasks from previous verification stages; and perform a first plurality of verification tasks from a first verification stage; and after completion of the first plurality of verification tasks, perform a second plurality of verification tasks from a subsequent verification stage.

9. The system of claim 5, wherein the one or more processing devices are further configured to:

determine that a feature of the source code has a plurality of possible options; and generate a separate verification task for two or more of the plurality of options.

10. The system of claim 5, wherein the one or more processing devices are further configured to:

determine that one or more verification tasks of the plurality of verification tasks has failed;

terminate all further verification tasks associated with the source code; and generate a notification indicating that the new version of the source code was not successfully verified.

* * * * *